INVENTORS
DUANE J. MCCONNELL
THEODORE H. ZBIKOWSKI
DEAN B. CHENOWETH

Aug. 13, 1957 D. J. McCONNELL ET AL 2,802,379
RETOOTHING MACHINE
Filed Sept. 19, 1952 6 Sheets-Sheet 6

INVENTORS
DUANE J. McCONNELL
THEODORE H. ZBIKOWSKI
DEAN B. CHENOWETH
BY Paul, Moore & Rugger
ATTORNEYS

United States Patent Office 2,802,379
Patented Aug. 13, 1957

2,802,379
RETOOTHING MACHINE

Duane J. McConnell, Theodore H. Zbikowski, and Dean B. Chenoweth, Minneapolis, Minn., assignors to Foley Manufacturing Company, Minneapolis, Minn., a corporation of Minnesota Application September 19, 1952, Serial No. 310,404

17 Claims. (Cl. 76—29)

This invention relates to new and useful improvements in retoothing machines and more particularly to new and useful improvements in retoothing machines of the type adapted for cutting new and independent teeth in the edge of a worn saw.

An object of this present invention is to provide a retoothing machine which will automatically move the edge of a sheet of material therethrough for cutting of teeth therein and which is dependable and easily operable by relatively unskilled people;

A further object of this invention is to provide a retoothing machine having a construction of maximum efficiency and economy and one which is provided with ease of operation and assembly;

A further object of this invention is to provide a retoothing machine having a stationary die, a punch reciprocable with reference to said stationary die and means cooperating with said reciprocable die to immovably position the surface from which the teeth are being cut as said reciprocable punch cuts teeth therefrom;

It is a further object of this invention to provide new and useful improvements in a retoothing machine whereby the saw may be readily inserted in a carrying frame and said carrying frame positioned in the retoother and automatically progressed therethrough;

Another object of this invention is the provision of new and useful retoothing machines having means whereby the pitch angle of the teeth to be cut may be easily varied;

Other objects reside in the constructional features of the stationary and reciprocating dies, in the constructional features of the adjustable means for determining the pitch of the teeth being cut; the constructional features of the means for operating the reciprocating punch; and the constructional features of the carrying frame and means for progressing it through said retoothing machine;

Still other objects are those inherent and apparent in the apparatus as described, pictured and claimed.

This invention will be described with reference to the drawings in which corresponding numerals refer to the same parts and in which.

Figure 1:
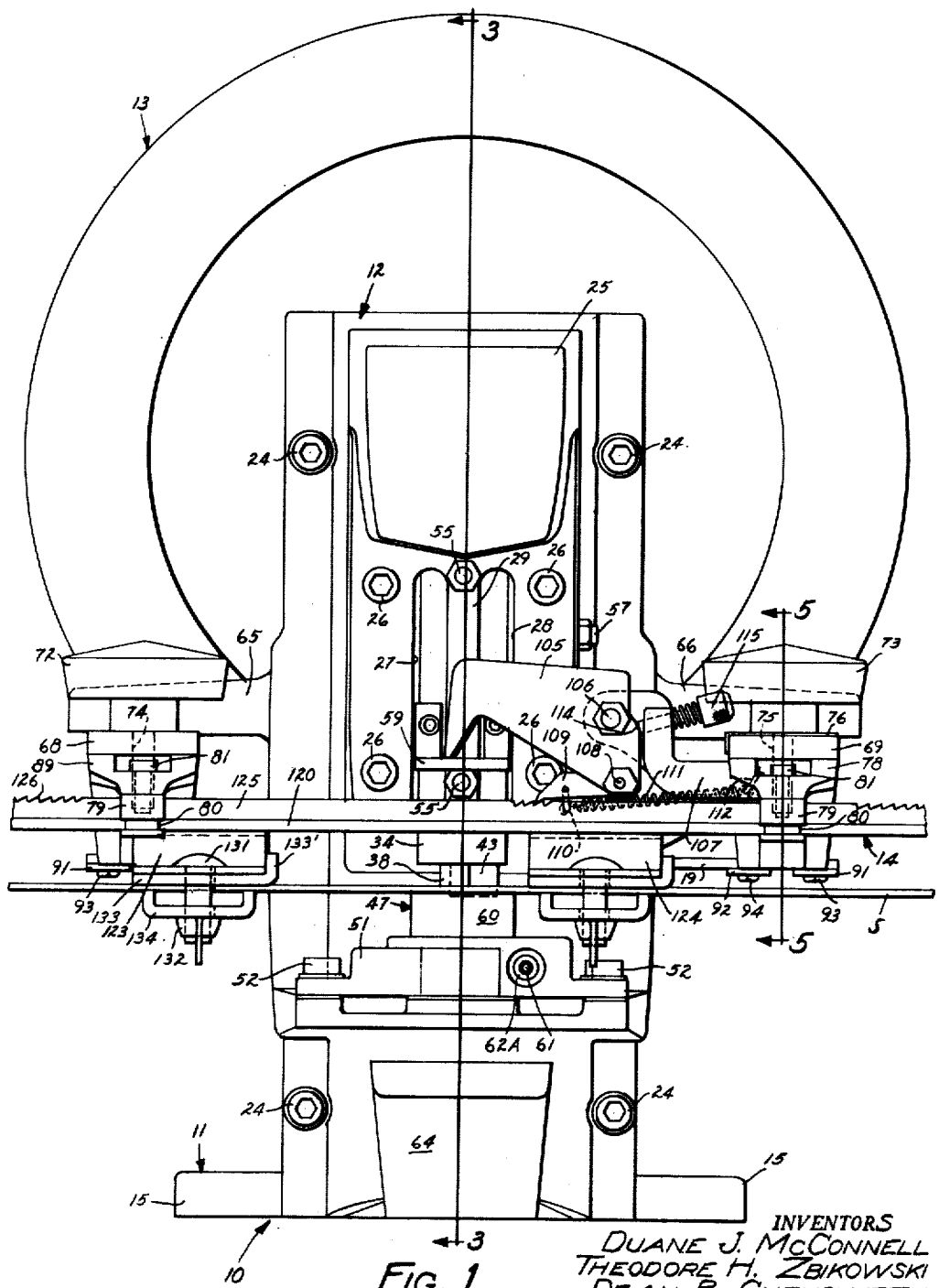
Figure 1 is a front elevation of the instant invention showing a saw blade positioned on the carrying frame.

Referring now to the drawings and particularly to Figure 1, the retoother, generally designated 10, is shown comprising a housing, generally designated 11, a throat, generally designated 12, a flywheel, generally designated 13, and a carrier guide assembly, generally designated 14.

The housing 11 is provided with a base flange 15 which is usually bolted or otherwise secured to the table on which the retoother is being used. The housing is of the configuration best shown in Figure 3 and is provided with a pair of wedge-shaped openings 16 in the side walls thereof for the purpose to be hereinafter explained. Positioned directly above the openings 16 is a central web 18 which extends across the housing to support a singletree 19, as will be more fully explained hereinafter. A bearing 20 is provided in housing 11 which is aligned with bearing 21 in throat 12 to support the shaft 22 of flywheel 13 for rotation therein. The flywheel 13 is secured to the exterior of shaft 22 by a key or other suitable means. Flywheel 13 is provided with a handle 23 which is used to rotate it.

Figure 3:
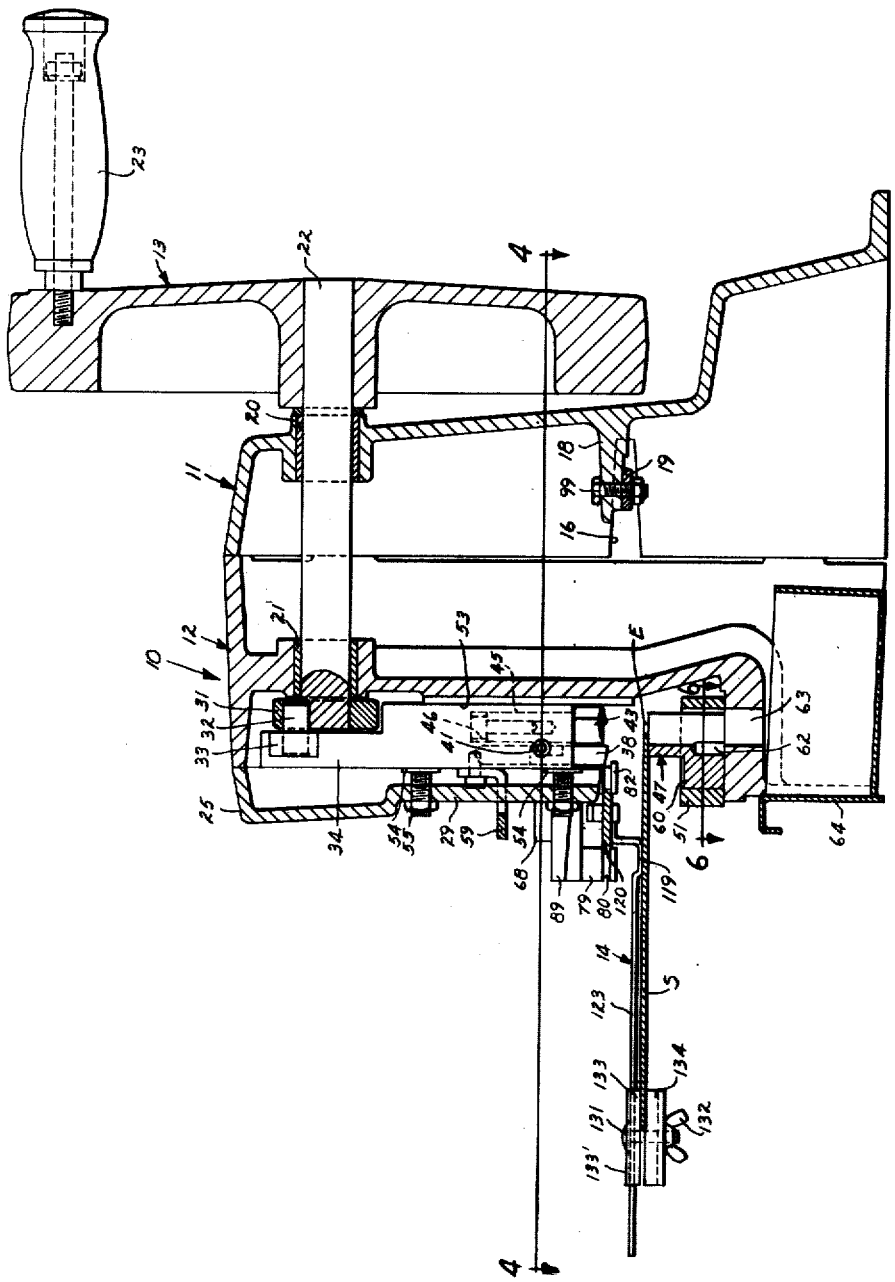
Figure 3 is a vertical sectional view taken along the line and in the direction of the arrows 3—3 of Figure 1.

The configuration of the throat 12 is likewise shown in Figure 3, and also in Figure 1. This configuration is adapted to cooperate with the configuration of housing 11 and is secured thereto by four cap screws 24. A cap 25 is secured to throat 12 by four cap screws 26. Cap 25 is provided at the center thereof with two elongated recesses 27 and 28 which are separated by an integral vertical member 29.

The shaft 22 is provided at its interior end with a round cap 31 in which a stud 32 is positioned off-center. Stud 32 has one end secured in any suitable fashion to cap 31 and the other end inserted in a recess in slidebar 33. Slidebar 33 is positioned for horizontal reciprocation in a rectangular recess at the top of punch holder 34 as is seen with reference to Figure 3, and in dotted lines in Figure 2. Thus, the circular motion of flywheel 13 is transformed through shaft 22, cap 31, stud 32 and slidebar 33 into vertical reciprocatory motion of punch holder 34.

Figure 8:
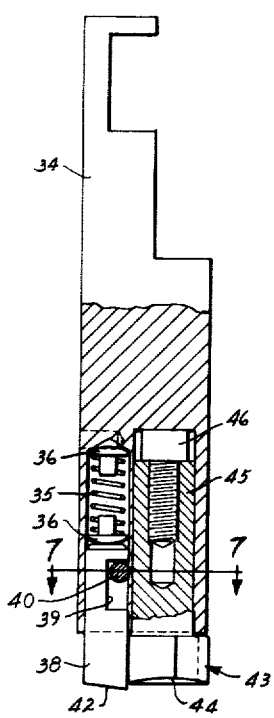
Figure 8 is a vertical sectional view of the reciprocating punch support taken along the line and in the direction of the arrows 8—8 of Figure 7.
Figure 7:
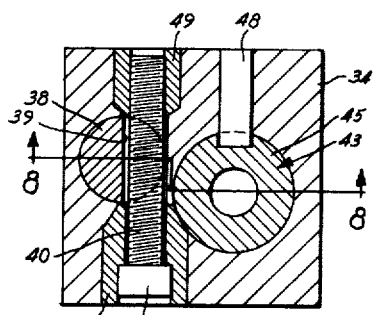
Figure 7 is an enlarged horizontal sectional view taken along the line and in the direction of the arrows 7—7 of Figure 8 and showing the reciprocating punch support and mechanism for holding the reciprocating punch therein.

The punch holder 34 is best seen in Figures 7 and 8. Referring specifically to Figure 8, it will be apparent that the punch holder is provided with a pair of vertical wells linearly spaced from front to rear with the forward one of said wells being smaller in diameter than the rearward one of said wells. Disposed in the front well is a coil spring 35 provided with a pair of engagement caps 36. These engagement caps are in the shape of rivets as is seen by reference to Figure 8. Caps 36 have the shank ends opposed so that the axial spring 35 presses one of these caps against the bottom of the well and the action of the spring 35 presses the other of said caps 36 against the interior end of stripper pin 38. Stripper pin 38 has a recess 39 through which is passed the shank 40 of a locking screw 41 as illustrated in Figures 7 and 8. Thus, locking screw 41 serves to prevent to removal of stripper pin 38 and yet to allow limited vertical reciprocatory motion thereof. It is noted at this time that the engagement face 42 of stripper pin 38 is slightly declined from front to rear and extends slightly beyond the lower surface of the punch 43.

Disposed in the rear well of punch holder 34 is punch 43. Punch 43 is designed to cut a V-aperture and is provided with an enlarged acute circular segmental cutting head 44 and a shank 45. Shank 45 has a concentric recess therein in which is threaded a cap screw 46, the head of which abuts the bottom end of the rearmost well in punch holder 34. This cap screw 46 is adjustable to determine the axial position of punch 43 with reference to holder 34. Thus, extending screw 46 depresses the punch 43 with reference to holder 34, and shortening screw 46 elevates punch 43 with reference to holder 34. Consequently, a range of adjustment is provided to compensate for any metal removed in the sharpening of the punch when necessary. Shank 45 of punch 43 is also provided with a vertically extending recess extending from one end to the other thereof, in which stationary pin 48, which is positioned in punch holder 34, as shown best in Figure 7, is adapted to slide. This allows vertical adjustment of punch 43 or the removal thereof from holder 34 but indexes punch 43 against rotation. When the screw head is in any position other than against the shank of the punch, the gap between the screw head and the punch shank is preferably filled with washers to transfer the cutting impact to the bottom of the punch socket without loading the threads.

It will be seen that the coil spring 35 normally engages stripper pin 38 which is free to reciprocate vertically a limited amount but which is maintained in the punch holder 34 by the shank 40 of locking screw 41. Locking screw 41 also serves to draw threaded element 49 and friction element 50 together whereby friction element 50 will be drawn against shank 45 as is seen with reference to Figure 7. As friction element 50 is provided with a concave edge adapted to cooperate with the periphery of shank 45 of punch 43, it will immovably position punch 43 in the punch holder 34. When it is desired to remove the stripper pin and punch from the punch holder, locking screw 41 is removed whereupon the stripper pin 42 may be moved downwardly with reference to Figure 8 and will emerge from the punch holder. Likewise, punch 43 may be moved downwardly and pin 48 will slide relative to the recess in shank 45 and the punch 43 may be removed. Adjustment screw 46 may then be turned to determine or adjust the position of the punch 43 with reference to holder 34 when the punch is once more reinserted, if desired.

Thus, it will be seen that as the punch holder 34 is reciprocated by turning the handle 23, punch 43 and stripper pin 38 will be reciprocated relative to the throat 12. Punch 43, as mentioned previously, is provided with a V-head 44 which is an acute sector of a circle. This is adapted to cooperate with a die 47, having an acute semicircular sector recess (or V-aperture) therein adapted to cooperate with punch 34, as is seen best with reference to Figure 3. Die 47 is provided with a circular base 60 which is received in a cooperating aperture in die holder 51. Holder 51 is attached to throat 12 by four cap screws 52, which are shown best in Figures 1, 2 and 4.

A round hole 62, is placed in the center of the die 47 running from the bottom upwardly approximately ⅔ of the height of the die, the function of this hole is to relieve stresses resulting from hardening of the die.

As is shown best in Figure 3, the punch holder 34 is maintained in position against a rear machined face 53 in throat 12 by a pair of forward gibs 54 which are maintained in position by gib screws 55. Gibs 54 may thus be adjusted leftwardly or rightwardly with reference to Figure 3, secured in this adjusted position and provide front bearing surfaces for punch holder 34.

Figure 2:
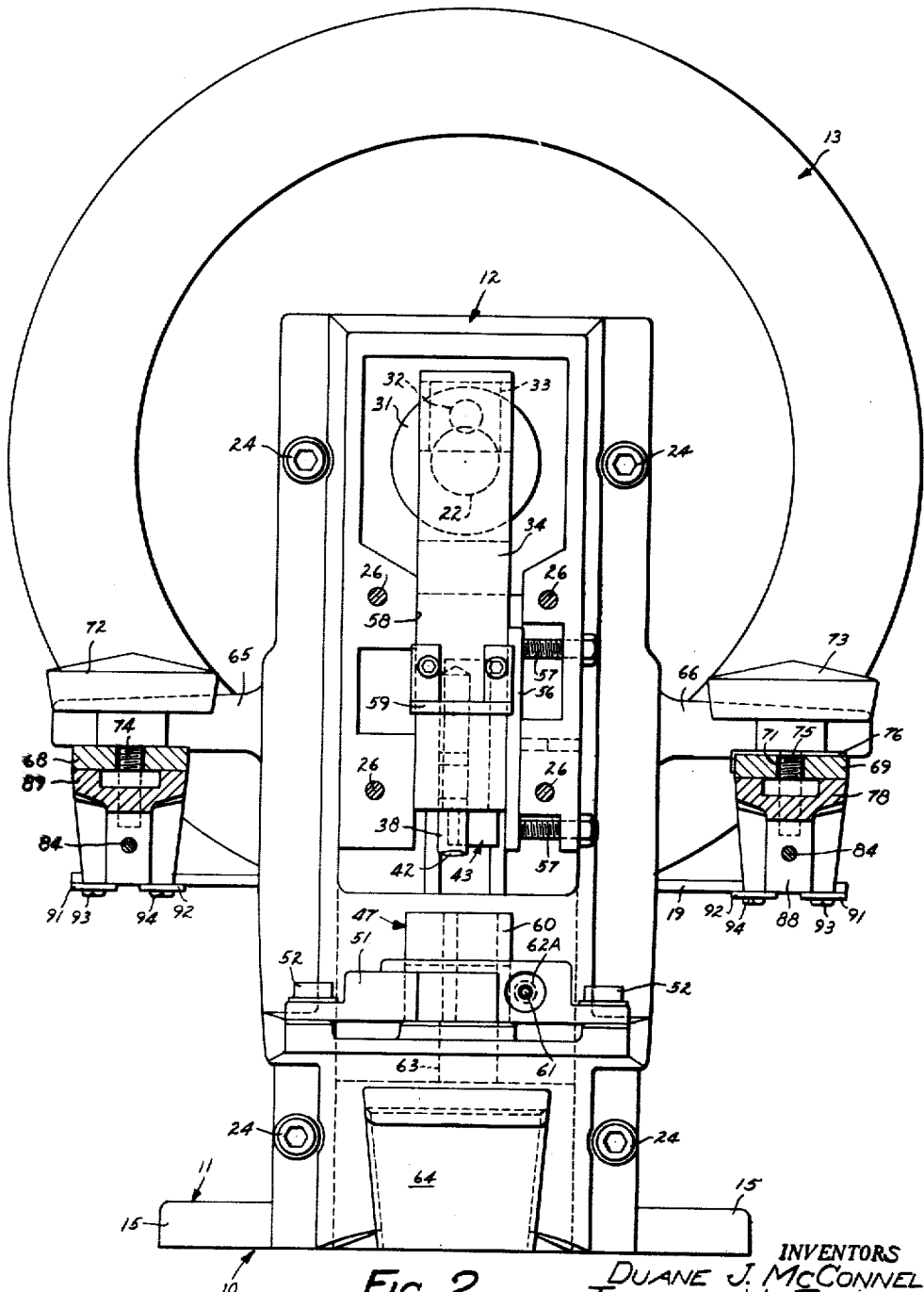
Figure 2 is a front elevation similar to that of Figure 1, but partially in section and with the saw and carrier removed from the retoother.

A side gib plate 56, as seen best with reference to Figure 2, is maintained in position by adjustable gib plate screws 57 and serves to position the left side of punch holder 34 (with reference to Figure 2) against the machined face 58. Thus, face 58 and gib plate 56 provide side bearings for the punch holder 34 and gibs 54 and machined face 53 provide rear and front dieings for the punch holder 34 so that holder 34 is allowed reciprocal vertical translation but is not allowed horizontal translation.

Positioned on the front of punch holder 34 is a lift member 59 of substantially U-shape which functions as hereinafter described.

Figure 6:
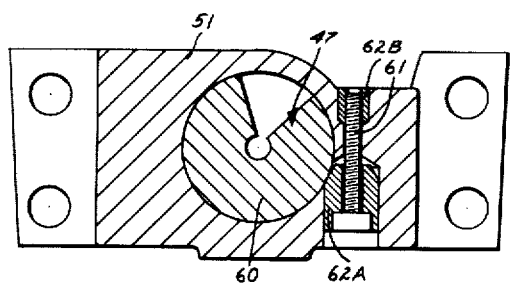
Figure 6 is an enlarged horizontal sectional view of the stationary die holder taken along the line and in the direction of the arrows 6—6 of Figure 3.

Die 47, which cooperates with punch 34, as may best be seen with reference to Figure 6, is maintained in position in the die holder 51 by a locking screw 61 which serves to draw threaded element 62B and friction element 62A together so that element 62A, having a cooperating surface which cooperates with the base 60 of the die 47, will immovably position the die against rotation as screw 61 is drawn up. Thus, it will be seen that the die may be rotated about its base with reference to the die holder 51 after screw 61 is loosened and screw 61 may be tightened to immovably position it so that the punch 34 cooperates with but does not impinge the acute semicircular recess of die 47. As is perhaps seen best with reference to Figure 3, the acute semi-circular recess extends from the top to the bottom of the die and is joined by a bore 62 which extends upwardly from the bottom of the die and approximately ⅔ of the way thereup. The base of the throat 12 is apertured at 63 to provide a chute through which the cuttings fall. The base of the throat 12 beneath the aperture 63 is provided with a channel in which a cuttings drawer 64 is positioned. Thus, any toothed cuttings produced by the cooperation of punch 43 and die 47 will fall through aperture 63 into drawer 64 and may be removed at will.

The housing 11 is provided with two extending supports 65 and 66. To each of these supports is positioned a forwardly extending arm 68 and 69 secured at right angles thereto as seen best with reference to Figures 1, 2 and 4. Each of the arms 68 and 69 is provided with a longitudinal recess at the forward end as shown best with reference to Figure 4. Supported by each of arms 68 and 69 are thumb wheels 72 for arm 68, and 73 for arm 69. Thumb wheels 72 and 73 are provided with shafts 74 and 75. Disposed on shaft 75 of thumb wheel 73 is a pointer 76 which indicates the relative position of the thumb wheel 73 in the longitudinal aperture 71 by reference to a scale inscribed on the exterior side of arm 69, not shown.

Shaft 75 of thumb wheel 73 is threaded into a right guide clamp 78. Clamp 78 is provided with a machined upper surface which is designed to slide with reference to the under surface of arm 69. Clamp 78 is provided with a forward guide block 79 of circular shape and having a circular recess 80 therearound. Block 79 is secured to clamp 78 by a cap screw 81. A rear guide block 82 is substantially identical with the front guide block 79 except that it is not fixedly secured to the clamp 78 but is provided with an upper surface adapted to slide on a bearing surface 83. It likewise has a circular recess 80 therearound. A cap screw 84 is horizontally threaded therein and the head of cap screw 84 is positioned in a horizontal well in block 78 as shown best in Figure 5. A compression spring 85 provided with an engagement rivet 86 abuts threaded retaining cap 87 and serves to bias block 82 in the direction of block 79 but to provide for limited reciprocating movement. The forward limit of block 82 is determined by the engagement of the underside of the cap screw 84 when the bottom of the horizontal well in block 78 and the rearward movement of block 82 is limited by engagement of the surface of block 82 with the surface 88 of block 78.

The shaft 74 of thumb wheel 72 is likewise threaded into a left guide clamp 89 which is substantially identical with clamp 78 and is provided with identical guide blocks 79 and 82 which function in identical fashion.

Attached to each of the clamps 78 and 89 is a pair of guide clamp straps 91 and 92 secured thereto by cap screws 93 and 94. These guide clamp straps are parallel as shown best with reference to Figures 1, 2 and 4, and are adapted to pivot about screws 93 and 94. The rear ends of straps 91 and 92 are secured to a singletree 19 by screws 96 and 97 and are likewise free to pivot thereabout.

Figure 4:
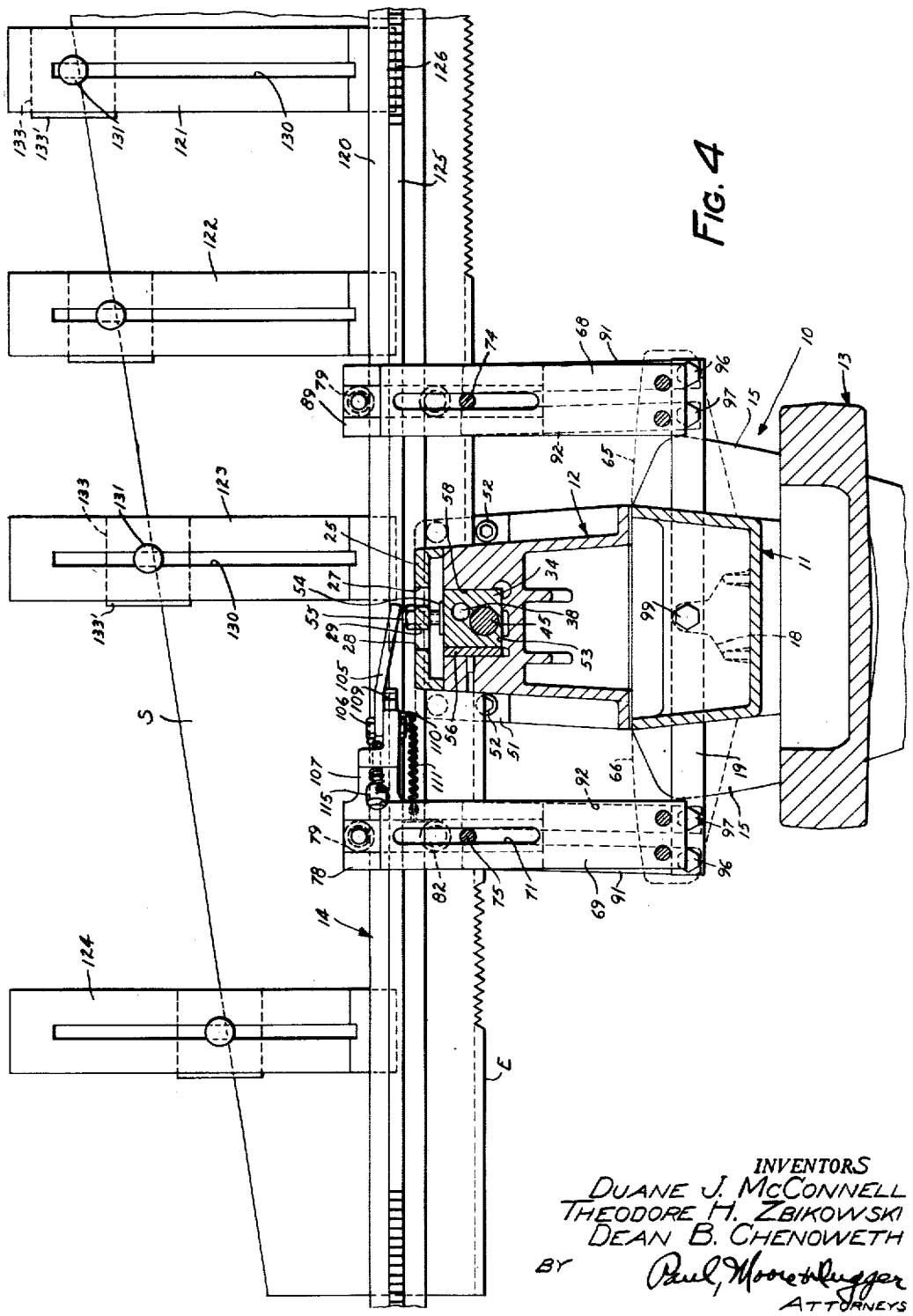
Figure 4 is a horizontal sectional view taken along the line and in the direction of the arrows 4—4 of Figure 3.

As is shown best with reference to Figure 4, the singletree 19 is pivoted at 99 to interior web 18 of housing 11 and extends through the wedge openings in housing 11.

Thus, it will be seen that when the thumb wheels 73 and 72 are loosened, one wheel and its accompanying guide clamp may be moved forwardly or rearwardly in its longitudinal slot and the other will move cooperatively but in the opposite direction. When one clamp is positioned rearwardly in its respective longitudinal aperture the other is positioned forwardly and vice versa. The clamps 78 and 89 will always remain parallel due to the action of the singletree and the parallel guide bars 91 and 92. Hence, inasmuch as the clamps 78 and 89 are always parallel because of the action of the parallel straps 91 and 92 and of the singletree 19, a carrier bar 120 may be positioned therein for movement therethrough whatever the position of clamps 78 and 89. Consequently, bar 120 may be pivoted with reference to the punch 34 and die 47 so that the angle of cut of the punched tooth will be varied. The index 76 on arm 69, by reference to an appropriate scale, will indicate the angle of the tooth being cut, the angle being computed with reference to the trailing edge of any tooth as the saw progresses through the machine from right to left and being variable from the angle of 0° to a clockwise angle of 30°. The scale on arm 69 is thus scribed so that when thumb wheel 73 is in its rearmost position in the longitudinal recess of arm 69, the trailing edge of any tooth being cut will be at an angle of 0° with reference to a line perpendicular to the path of travel of the saw through the machine, and when the thumb wheel 73 is in its foremost position in the longitudinal recess in arm 69, the trailing edge of the tooth of any saw passing through the machine will be cut at a clockwise angle of 30° with reference to a line perpendicular to the path of travel of the saw through the machine. Thus, the pitch or "hook" of the saw teeth may be varied between 0° and 30°. The distance between the centers of screws 93 and 96 is equal to the distance from the center of screw 99 to the center or intersection of cutting surfaces of die 47. This fact insures uniform depth of cut regardless of hook angle being produced.

Lift member 59, as it reciprocates up and down by virtue of the reciprocation of holder 34 engages feed lever 105 as is best shown with reference to Figure 1. Feed lever 105 is pivoted about 106 on an L extension 107 of guide clamp 78. Lever 105 is provided with shouldered screw 108 on which is pivoted a pawl 109. Pawl 109 is provided with an extending hook 110 to which is attached an extension spring 111 which is connected at the other end to a hook 112 which is positioned in clamp 79. The rightward end of lever 105 with reference to Figure 1 is provided with a cam surface 114 upon which a spring biased adjustment screw 115 is adapted to bear. Thus, rotation of screw 115 to exert more pressure upon surface 114 will pivot the feed lever 105 rightwardly with reference to pivot 106 so that it will not be engaged by lift member 59 until the reciprocating punch 43 has progressed upwardly to a greater extent. Thus, the amount of reciprocal rotation of feed lever 105 may be varied and the amount of feeding of the pawl 109 will likewise be varied as is well understood.

The carrier guide assembly, generally designated 14, is best shown in Figures 1, 3 and 4. It is provided with a carrier bar 120 on which are spaced four hangers 121–124. Hangers 121–123 are spaced substantially equidistant and hanger 124 is spaced from hanger 123 a distance approximately double the spacing between the other hangers. This is done because, as shown in Figure 4, the saw S, being carried by the carrier assembly 14, progresses through the machine with the heel or butt end of the saw first and the lighter or toe end does not need the extensive support of the heavier or butt end and consequently hanger 124 is sufficient to support the toe end whereas the three hangers 121–123 are necessary to support the butt end.

Each of the hangers 121–124 may be provided with an offset portion 119 against which the surface of the saw S abuts. Removably attached to the upper surface of the carrier bar 120 is a ratchet bar 125 which may be removably secured thereto by any suitable means. In this case, it is provided with end hooks and a center pin which serve to resiliently position it in cooperating apertures in bar 120, not shown. Ratchet bar 125 has a plurality of teeth 126 which are adapted to cooperate with pawl 109 so as to provide a pawl and ratchet combination for progressing the carrier bar assembly 14 through the machine from right to left with reference to Figure 4. As is well understood, ratchet bars of greater or lesser teeth may be used to determine the rate of feed of carrier 14 through the machine and thus the number of teeth per inch cut.

Each of the hangers 121–124 is provided with a longitudinal recess 130, in which is slidably supported a bolt 131, having a wing-nut 132 thereon. Hung on each bolt 131 is an inner clamp 133 having a curved edge 133' which laps over the edge of the hanger and acts as a washer, and an outer clamp 134 of U-shape. To mount a regular hand saw in the carrier assembly 14, both clamps are used, clamp 133 being turned so that its curved edge 133' laps over the side of the hanger and the saw S is gripped between it and the outer clamp 134, as shown best in Figure 1. To mount a back or miter saw on the carrier, the outer clamps 134 are removed altogether and the curved side of the inner clamp 133 is turned down whereupon the saw is gripped between the hanger and the inner clamps 133. The hump or offset 199 of the hangers 121–124 serves to space the blade of the saw S away from the hanger surface which allows the mounting of a regular saw by use of the double clamps or of a back or miter saw by use of the single inner clamps as aforesaid.

Figure 5:
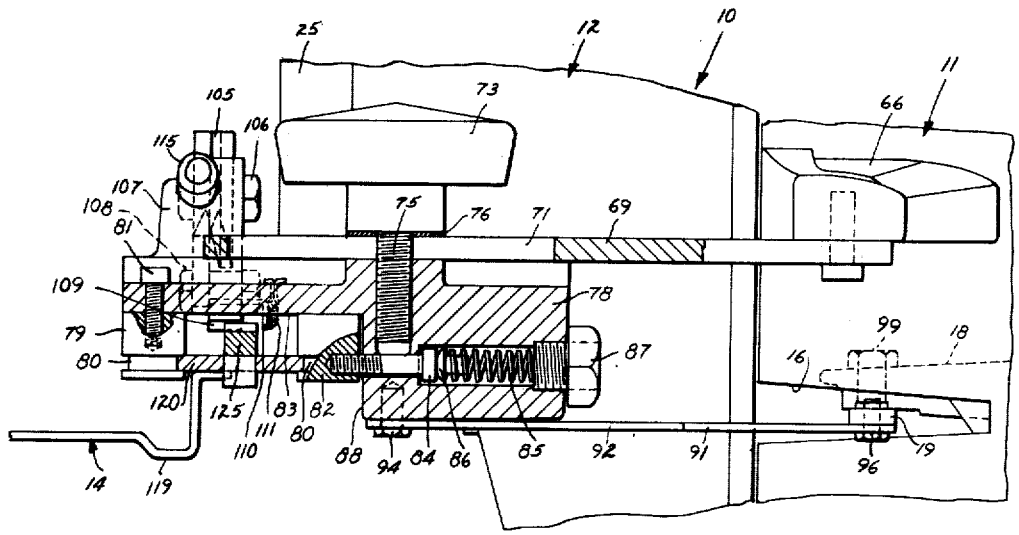
Figure 5 is an enlarged detail sectional view of the tooth pitch adjusting mechanism taken along the line and in the direction of the arrows 5—5 of Figure 1.

The carrier bar 120 is inserted between the stationary guide blocks 79 and the resilient guide blocks 82 and fits in recesses 80 therein as shown in Figure 5. As the lift bar 59 reciprocates vertically, it pivots feed bar 105 which in turn pivots pawl 109 and pawl 109 engages the teeth of ratchet bar 126 and thus progresses the carrying assembly 14 through the retoother.

In operation, the saw S is positioned in the carrying assembly 14 as shown best in Figure 4, and, if it is a regular straight saw, it is clamped between the outer clamps 134 and the inner clamps 133 and wing-nuts 132 are tightened to maintain it in this position.

If a back or miter saw is being clamped to carrier 14, the outer clamps 134 are removed altogether and the curved side of the inner clamps 133 is turned down whereupon the saw is gripped between the hangers and the inner clamps 133 as aforesaid. The inner edge E of the saw S overlaps carrier bar 120 and also the apex of the arcuate shaped aperture 63 in die 47 so that the punch 43 will cut new teeth from the edge of the saw. It is customary to use a tapered guage which will determine the overlap of the edge of the saw over carrier bar 120. Thus, if a saw S is being cut with a lesser number of teeth per inch, the overlap must be greater as the teeth will be larger and deeper. This is well understood and forms no part of this invention per se; consequently will not be described. The ratchet bar 125 is suitably chosen so that the desired number of teeth per inch will be cut. Ratchet bars having various size of ratchet teeth thereon are available and the progression of the carrier 14 through the retoother and consequently the number of teeth cut per inch will be determined by the size of the teeth on ratchet bar 125. Carrier bar 120 is progressed from right to left through the retoother with reference to Figure 1.

The handle 23 of flywheel 13 is then rotated, rotating shaft 22 which, through head 31, pin 32 and bar 33, serves to reciprocate punch holder 34 in a vertical direction to cut teeth from the edge E of the saw by virtue of the cooperation of punch 43 and stationary die 47. When adjustments are necessary, either the front gibs 54 or the side gib plate 56 is adjusted to maintain a snug set on holder 34 as it reciprocates. As holder 34 reciprocates, lift member 59 likewise reciprocates and engages member 105 to intermittently reciprocate pawl 109 from right to left with reference to Figure 1 and thus advance the carrier 14 through the machine because of the engagement of the pawl 109 with the teeth of ratchet bar 125.

Stripper pin 38 is provided with a relatively strong spring and because of its position and the decline of its engagement face as shown best in Figure 3, will engage the edge of the saw immediately adjacent the apex of the punch 43 and thus serve to removably grip the edge E of the saw S between stripper pin 48 and die 47 while the tooth is being cut.

If it is desired to vary the angle at which the teeth are being cut or the "hook" of the teeth, thumb wheels 72 and 73 are loosened and guide clamp 78 is moved forwardly or rearwardly with reference to Figure 1 until the index finger 76 indicates the desired pitch between 0° and 30°. The cooperation of straps 91 and 92 of each of guide clamps 78 and 89 with the singletree 19 provides that one pair of guide blocks 79 and 82 will always be parallel to the other pair of guide blocks 79 and 82 and the carrier bar 120 will be pivoted about a point in a vertical plane perpendicular to the direction of travel of the edge 80 through the retoother.

As many apparently widely differing embodiments of this invention may be made without departing from the spirit and the scope thereof, it is to be understood that we do not specifically limit ourselves to the embodiment disclosed herein.

What we claim is:

1. A retoother comprising in combination a punch, means for vertically reciprocating said punch relative to a stationary die, means for moving an edge to be retoothed past said stationary die in a substantially linear plane of travel, a pair of horizontally movable guide elements positioned one on either side of said stationary die, and means interconnecting said guide elements together whereby movement of one of said guide elements will provide corresponding movement of the other of said guide elements for pivoting said edge about a point whose horizontal projection coincides with the intersection of the cutting faces of the die.

2. The apparatus of claim 1 further characterized in that said edge is mounted in a removable carrier and means on each of said guide elements for removably positioning said carrier therein.

3. The apparatus of claim 1 further characterized in that each of said guide elements is provided with a pair of parallel arms pivoted at one end thereto and at the other end to a connecting singletree.

4. The apparatus of claim 1 further characterized in that a pair of elongated supports is provided one on either side of said reciprocating punch, said elongated supports having elongated apertures therein and threaded means for supporting one of each of said guide elements from said elongated supports.

5. A retoother comprising in combination a punch, means for vertically reciprocating said punch relative to a stationary die, means for moving an edge to be retoothed past said stationary die in a substantially linear path, a pair of horizontally movable guide elements positioned one on either side of said stationary die, means interconnecting said guide elements whereby movement of one of said guide elements will provide corresponding movement of the other of said guide elements for pivoting said edge about a point lying in a vertical plane transverse to the direction of travel of said edge past said stationary die, said means interconnecting said elements comprising pivoted link means.

6. The apparatus of claim 5 further characterized in that each of said guide members comprises a pair of depending members for retaining said carrier therein, one of said members being resiliently biased in the direction of the other of said members.

7. A retoother comprising in combination a punch, means for vertically reciprocating said punch relative to a stationary die, means for moving an edge to be retoothed past said stationary die in a substantially linear path, a pair of horizontally movable guide elements positioned one on either side of said stationary die, each of said guide elements having a pair of depending members for retaining a removable carrier therein, one of said members being resiliently biased in the direction of the other of said members, pivoted link means interconnecting said guide elements together whereby movement of one of said guide elements will provide corresponding movement of the other of said guide elements for pivoting said edge about a point.

8. The apparatus of claim 7 further characterized in that a pair of elongated supports is provided one on either side of said reciprocating punch, said elongated supports having elongated apertures therein and threaded means for supporting one of each of said guide elements from said elongated supports, and each of said guide elements being provided with a pair of parallel arms pivoted at one end thereto and at the other end to a connecting singletree.

9. A retoother comprising in combination a reciprocating punch reciprocal vertically with reference to a stationary die, means for reciprocating said punch, means for supporting an edge to be retoothed, means for traversing said edge past said reciprocating punch in a substantially linear path of travel, a resiliently mounted pin having an extension slightly greater than the extension of said reciprocating punch carried by said reciprocating punch for engaging said linear edge being retoothed and forcing it against said stationary die during the engagement of said reciprocating punch with said edge, said pin being provided with a slightly declined engagement surface, and said decline being in the direction of said reciprocating punch.

10. The apparatus of claim 9 further characterized in that said pin is positioned immediately adjacent the apex of said reciprocating die.

11. A retoother comprising in combination a reciprocating punch reciprocal vertically with reference to a stationary die, means for reciprocating said punch, means for supporting an edge to be retoothed, means for traversing said edge past said reciprocating punch in a substantially linear path of travel, means carried by said reciprocating punch for engaging said linear edge being retoothed and forcing it against said stationary die during the engagement of said reciprocating punch with said edge, said means for engaging said linear edge comprising a resiliently mounted pin mounted for reciprocation with and by said punch having an extension greater than the extension of said reciprocating punch, said resiliently mounted pin being provided with a slightly declined engagement surface, said decline being in the direction of said reciprocating punch and said pin being further characterized in that it is positioned immediately adjacent the apex of said reciprocating punch.

12. A retoother comprising in combination a punch vertically reciprocal with reference to a stationary die for the formation of teeth in a linear edge, means for reciprocating said punch, guide means for supporting an edge carrier, an edge carrier supported from said guide means for supporting the edge as said edge is progressed past said reciprocating die, means for advancing said carrier past said reciprocating punch as said reciprocating punch reciprocates and in response thereto, and said carrier comprising an elongated member having a plurality of depending hanger members attached thereto, and said hanger members each being provided with a depending offset portion adjacent their juncture with said elongated member.

13. The apparatus of claim 12 further characterized by a resiliently positioned ratchet bar positioned on top of said elongated member adapted for cooperation with a feed pawl, said feed pawl being adapted to cooperate with the reciprocation of said punch for the feeding of said carrier through the retoother.

14. A retoother comprising in combination a punch vertically reciprocable with reference to a stationary die for the formation of teeth in a linear edge, means for reciprocating said punch, guide means for supporting an edge carrier, an edge carrier supported from said guide means for supporting the edge as said edge is progressed past said reciprocating punch, means for advancing said carrier past said reciprocating punch as said reciprocating punch reciprocates and in response thereto comprising a feed pawl, said carrier having an elongated member having a plurality of depending hanger members attached thereto, an elongated ratchet bar resiliently positioned on top of said elongated member for cooperation with said feed pawl, said edge carrier being suspended beneath each of said guide means by a pair of depending members one of which is resiliently biased toward the other and said hanger members being provided with a depending offset portion adjacent the juncture with said elongated member.

15. In a saw retoother comprising in combination a punch, means for vertically reciprocating said punch relative to a stationary die, means for moving an edge to be retoothed past said stationary die, the improvement comprising in combination a housing in which said punch reciprocates, said housing having a rear machined face for abutment with one side of said punch and a side machined face for abutment with an adjacent side of said punch, a pair of adjustable bearing surfaces positioned opposite said rear machined face in abutment with the front of said punch for retaining said punch against said rear machined face and an adjustable bearing plate disposed opposite said side machined face for supporting said punch thereagainst.

16. A saw retoother comprising in combination a punch, means for vertically reciprocating said punch relative to a stationary die, means for moving an edge to be retoothed past said stationary die, the improvement comprising a holder for said punch having a first aperture for receiving the shank of said punch therein, a second aperture for receiving a resiliently mounted pin therein, and an adjustable screw cooperable with said shank and said resiliently mounted pin for maintaining the same in said holder.

17. In a saw retoother comprising in combination a punch, means for vertically reciprocating said punch relative to a stationary die, means for moving an edge to be retoothed past said stationary die, the improvement comprising a housing having an open space therein, a cover plate for said housing, a machined surface on the interior of said housing, a plurality of pads oppositely disposed to said machined face for holding a slidable arbor in said housing, said pads being positioned for adjustable movement through said cover plate.

References Cited in the file of this patent

UNITED STATES PATENTS

| | | |
|---|---|---|
| 1,319,662 | Traub | Oct. 21, 1919 |
| 1,321,139 | McClenathen | Nov. 11, 1919 |
| 1,805,831 | Mathieu | May 19, 1931 |
| 2,067,259 | Clark | Jan. 12, 1937 |
| 2,098,022 | Williams | Nov. 2, 1937 |
| 2,407,821 | Engle | Sept. 17, 1946 |
| 2,498,167 | Lorenz | Feb. 21, 1950 |
| 2,514,567 | Daggett | July 11, 1950 |
| 2,519,748 | Duquette | Aug. 22, 1950 |
| 2,625,059 | Stadick | Jan. 13, 1953 |

UNITED STATES PATENT OFFICE

CERTIFICATE OF CORRECTION

Patent No. 2,802,379                                                August 13, 1957

Duane J. McConnell et al.

It is hereby certified that error appears in the printed specification of the above numbered patent requiring correction and that the said Letters Patent should read as corrected below.

Column 1, line 32, for "die" read -- punch --; line 45, after "stationary" insert -- die --; same line, after "reciprocating" strike out "dies" and insert instead -- punch --; column 2, line 63, for "to removal" read -- the removal --; column 8, lines 43 and 68, for "die", each occurrence, read -- punch --.

Signed and sealed this 14th day of October 1958.

(SEAL)
Attest:

KARL H. AXLINE
Attesting Officer

ROBERT C. WATSON
Commissioner of Patents